Jan. 24, 1967   E. R. ZIEGLER   3,299,721
WINDSHIELD WIPER DRIVE AND UNIVERSAL JOINT THEREFOR
Filed Dec. 23, 1963   2 Sheets-Sheet 1

INVENTOR.
EUGENE R. ZIEGLER
BY W. E. Tinker
HIS ATTORNEY

INVENTOR.
EUGENE R. ZIEGLER

United States Patent Office 3,299,721
Patented Jan. 24, 1967

3,299,721
**WINDSHIELD WIPER DRIVE AND
UNIVERSAL JOINT THEREFOR**
Eugene R. Ziegler, Spencerport, N.Y., assignor to General Motors Corporation, Detroit, Mich., a corporation of Delaware
Filed Dec. 23, 1963, Ser. No. 332,487
2 Claims. (Cl. 74—75)

This invention pertains to windshield wiper mechanism and particularly to an improved windshield wiper linkage drive having universal joints at all points of linkage connection.

Heretofore, it has been customary to embody universal, or ball and socket joints in windshield wiper linkage drives at only some of the connections between the drive links and other components. However, it has been found that misalignment frequently occurs in windshield wiper installations in a vehicle which cause destructive wear on ordinary pin joints with resultant noise, erratic windshield wiper movement and premature failure of some of the linkage drive components. One aspect of the present invention comprehends the use of universal joints at all points of connection between linkage components which are subject to misalignment in windshield wiper installations. Another aspect of the present invention comprehends the use of prestressed sockets for the universal joints which will automatically provide compensation for wear caused by windshield wiper operation so as to maintain the linkage drive at optimum performance conditions throughout its expected life.

Accordingly, among my objects are the provision of an improved windshield wiper linkage drive having universal joints at all points of connection which are subject to misalignment in a vehicle installation; the further provision of improved universal joints for windshield wiper linkages embodying a prestressed socket; the further provision of a ball and socket joint for a windshield wiper linkage driving including a two-piece socket for a windshield wiper linkage drive including a two-piece socket for receiving a ball stud having larger diameter than the socket and means for assembling the socket with a link so as to prestress the socket when a connection is made; and the still further provision of a ball and socket joint of the aforesaid type including a readily releasable spring latch for maintaining the two-piece socket in assembled relation.

The aforementioned and other other objects are accomplished in the present invention by attaching a ball stud to each component of the windshield wiper linkage drive which has a fixed axis of rotation and by providing a socket at each end of the several links which interconnect these components. In both embodiments disclosed herein the ends of the links are formed with integral hemispherical depressions for receiving one part of the socket. In the preferred embodiment of each ball and socket joint, two nonferrous parts, preferably of Phosphor bronze, are connected to each end of each connecting link by fasteners, such as rivets or bolts, with the ball stud disposed in the socket recess so as to stress, or spring load, the socket by virtue of the fact that the diameter of the ball is greater than the diameter of the socket. In a modified embodiment, one part of each socket is riveted to each end of a link, and the other part of the socket is hingedly connected thereto and releasably retained in assembled relation by an integral spring latch.

Further objects and advantages of the present invention will be apparent from the following description, reference being had to the accompanying drawings, wherein preferred embodiments of the present invention are clearly shown and wherein similar numerals depict similar parts throughout the several views.

Figure 1:
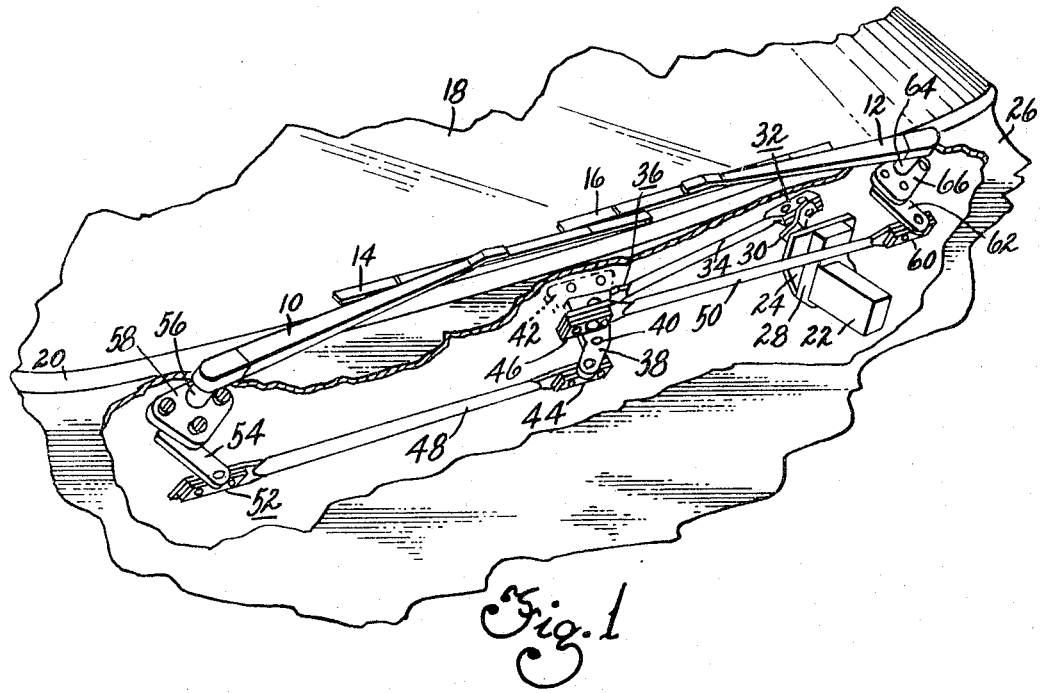
FIGURE 1 is a fragmentary perspective view of a vehicle with the cowl portion cut away depicting the improved windshield wiper linkage drive of the present invention.

Referring to FIGURE 1, the improved linkage drive is shown in conjunction with an overlapping path windshield wiper system comprising a pair of wiper arms 10 and 12 having spring hinge connected inner and outer sections which carry wiper blades 14 and 16, respectively. The wiper arms and blades are movable in phase opposition across the outer surface of the vehicle windshield 18, and the paths of the wiper blades 14 and 16 intersect, or overlap, at the central portion of the windshield adjacent the lower reveal molding 20. In the parked position, as shown, the blade 16 is located above the blade 14 and in engagement therewith. However, during running operation it is to be understood that the wiper blades move simultaneously in phase opposition throughout their running strokes without interference.

The windshield wiper mechanism includes an electric motor 22 supported by a bracket 24 suitably attached to the vehicle cowl structure 26. The motor 22 is connected through a suitable gear reduction 28 to a rotary crank arm 30. The outer end of the crank arm 30 is connected through a universal joint 32 attached to the end of a drive link 34. The other end of the drive link 34 has a ball and socket, or universal joint, connection 36 with one end of a centrally mounted oscillating lever 38. The oscillating lever 38 is attached to a stub shaft 40 rotatably supported by a bracket 42 attached to the cowl structure 26.

During rotation of the crank 30 by the motor 22, oscillation will be imparted to the centrally mounted oscillating lever 38 through universal joint 32, drive link 34 and universal joint 36. Opposite ends of the oscillating lever 38 have universal joint connections at 44 and 46 with the ends of connecting links 48 and 50, respectively. Connecting link 48 has a universal joint connection at 52 with a crank arm 54 attached to a pivot shaft 56 journalled in a bracket 58 attached to the cowl structure 26. The wiper arm 10 is drivingly connected to the pivot shaft 56. The outer end of connecting link 50 has a universal joint connection at 60 with a crank arm 62 attached to a pivot shaft 64 journalled in a bracket 66 attached to the cowl structure 26. The wiper arm 12 is drivingly connected with the pivot shaft 64.

As is apparent from the foregoing description, the ends of all links have universal joint connections with their respective levers or crank arms so as to compensate for misalignment of the windshield wiper installation within the vehicle. The crank arms 30, 54 and 62 have fixed axes of rotation within the vehicle, as does the oscillating lever 38. The universal joint connections between the links and these components permit limited movement in all directions to compensate for any such misalignment and, in addition, as will be pointed out more particularly hereinafter, the universal joints are constructed in a manner so as to automatically compensate for wear. It is also to be noted that each universal joint connects a crank or lever to the end of a link which is disposed at substantially a right angle thereto. Moreover, it is to be understood that the particular linkage drive disclosed herein is only by way of example, and not by way of limitation, in that the concept of embodying universal joints at all points of linkage connection can be readily adapted to windshield wiper linkage drives of all types.

Figure 2:
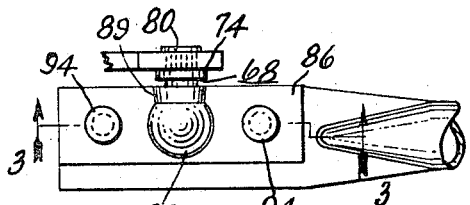
FIGURE 2 is a fragmentary plan view of the preferred ball and socket joint.
Figure 4:
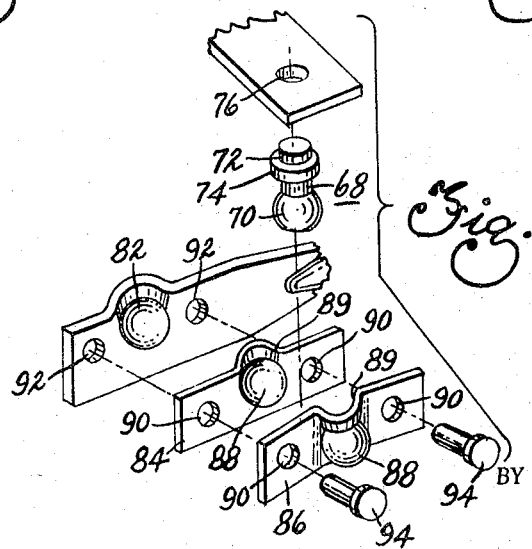
FIGURE 4 is an exploded view of the components comprising the preferred ball and socket joint.

Referring to FIGURES 2 and 4, each universal joint includes a ball stud 68 having a ball end 70. Each ball stud 68 is rigidly connected to its respective crank arm or lever by both a fusion weld and a hot upset in accordance with the teachings of Carlson et al. Patent 3,039,789. To this end, each ball stud 68 has a knurled shank portion 72 with a shoulder 74 at one end thereof. The knurled shank 72 is adapted to be press fitted into a circular aperture 76 in a crank arm or lever. After the ball studs are press fitted in their crank arms or levers, the parts are transferred to a welding fixture to produce a ring weld between the knurled portion 72 and the inner surface of the aperture in the crank arm or lever and an upset portion 80 between the upper surface of the ball stud and the crank or lever.

Each end of each of the sheet metal links 34, 48 and 50 is formed with a hemispherical depression 82 for receiving one part of the socket forming each universal joint. This hemispherical recess in each end of each link constitutes a rigid support and retainer for the two-piece socket of each universal joint which is subsequently attached thereto. The universal joints 36, 44, 46, 52 and 60 may be permanent, that is, these joints may be assembled with the linkage drive prior to installation in a vehicle whereas the universal joint 32 must be removable to facilitate installation of the wiper motor and the drive linkage in the vehicle. Moreover, in both embodiments disclosed herein the universal joints are prestressed, or spring loaded, by virtue of the fact that the diameter of the socket recess is less than the diameter of the ball end 70 of the stud such that when the two socket parts are assembled over the ball end 70, the socket structure will automatically take up or compensate for wear in the joint caused by operation of the windshield wiper mechanism. This constitutes an important feature of the present invention inasmuch as it eliminated looseness in the joints and thus precludes noisy and erratic operation of the windshield wiper system throughout the life of the vehicle.

Figure 3:
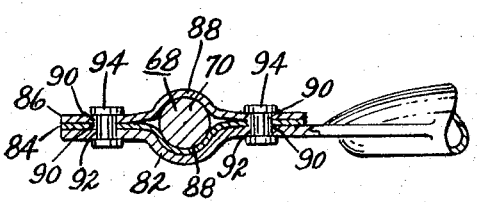
FIGURE 3 is a sectional view taken along line 3—3 of FIGURE 2.

In the preferred embodiment of the universal joints, the sockets comprise phosphorous bronze parts 84 and 86 having substantially hemispherical recesses 88 with semicylindrical entrance openings 89. The socket parts 84 and 86 are formed with an aperture 90 in their legs on each side of the hemispherical recess. The apertures 90 in the legs of the socket parts 84 and 86 are aligned with apertures 92 formed in the link on opposite sides of the hemispherical depression 82. If desired, the lower socket part 84 may be made of thinner stock than the upper socket part 86 since the link provides support therefor. The permanent universal joints 36, 44, 46, 52 and 60 are assembled with the links by rivets 94 by first inserting the ball end 70 between the socket parts and then riveting the socket to the link as shown in FIGURES 2 and 3. As alluded to hereinbefore, the spherical recess defined by the socket parts has a smaller diameter than the ball end 70 so that the upper socket part 86 is prestressed by its attachment to the link so as to provide an automatic takeup for wear in the universal joint. This is achieved by making the substantially hemispherical recess 88 in the upper socket part 86 of the same radius, but of lesser depth than the substantially hemispherical recess 88 in the lower socket part 84. In addition, the legs of the upper socket part 86 preferably have a reverse curvature as shown in FIGURE 4 so as to be stressed upon attachment to the link. It is to be noted that the legs of the socket parts are spaced from each other adjacent the ball 70 as shown in FIGURE 3. Moreover, a suitable lubricant may be incorporated in the socket during assembly thereof with the ball end 70.

Figure 5:
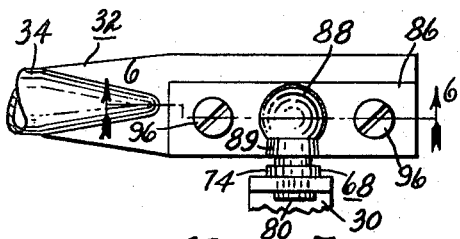
FIGURE 5 is a fragmentary plan view of the removable connection of one of the ball and socket joints of the preferred embodiment.
Figure 6:
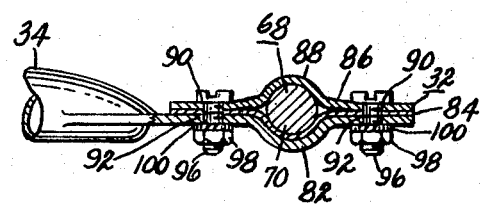
FIGURE 6 is a sectional view taken along line 6—6 of FIGURE 5.

With reference to FIGURES 5 and 6, the removable universal joint 32 embodies the same socket parts 84 and 86, but is attached to the drive link 34 by a pair of bolts 96 which receive nuts 98 and lock washers 100. This removable connection is necessary to facilitate installation of the windshield wiper drive system within a vehicle.

Figure 7:
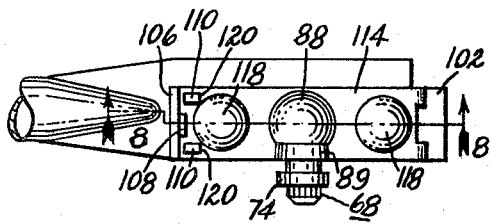
FIGURE 7 is a fragmentary view of a modified embodiment of a ball and socket joint.
Figure 8:
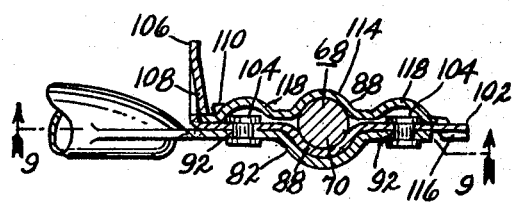
FIGURE 8 is a sectional view, taken along line 8—8 of FIGURE 7.
Figure 9:
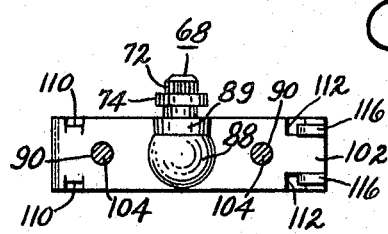
FIGURE 9 is a sectional view taken along line 9—9 of FIGURE 8.

Referring to FIGURES 7 through 9, all of the universal joints may be of the readily releasable type, and to this end comprise a socket part 102 which is seated in the hemispherical depression of a link and permanently attached thereto by rivets 104. The lower socket part 102 is formed with an upstanding leg 106 having an integral spring latch or arm 108 struck out therefrom, a pair of upstanding lugs 110 and a pair of opposed notches 112. The upstanding lugs 110 are formed adjacent the leg 106 whereas the notches 112 are located at the other end of the socket part 102. The upper socket part 114 is hingedly connected to the socket part 102 by a pair of offset lugs 116 situated in the notches 112 and extending beneath the end of the socket part 102. The socket part 114 formed with a pair of depressions 118 to accommodate the heads of the rivets 104 and a pair of apertures 120 for receiving the upstanding lugs 100. The spring latch 108 is automatically depressed by movement of the socket part 114 towards the socket part 102 and thereafter engages the upper surface of the socket part 114 to retain the socket parts in assembled relation. In order to remove the socket part 114 to disconnect the universal joint, it is only necessary to depress the spring latch 108 with a suitable hand tool. Since the socket part 114 is stressed, or spring loaded, by virtue of the socket defined by the substantially hemispherical recesses 88 in the socket parts 102 and 114 being of smaller diameter than the diameter of the ball end 70 as described in connection with the preferred embodiment, the socket part 114 will snap upwardly about its hinged connection with the part 102 to facilitate removal of the ball end 70 therefrom.

While the embodiments of the invention as herein disclosed constitute preferred forms, it is to be understood that other forms might be adopted.

What is claimed is as follows:

1. A universal joint connection for a windshield wiper linkage including, a first socket part of nonferrous metal having a hemispherical recess with an entrance opening, a second socket part of nonferrous metal having a hemispherical recess with an entrance opening and aligned with said first socket part to define a sperical recess, a ball stud having a ball end of a diameter larger than the diameter of said spherical recess in the socket parts and disposed therein, and engaging means integral to said first and second socket parts for attaching the socket parts to each other, said first and second socket parts resiliently engaging said ball stud to automatically compensate for wear in the universal joint.

2. The universal joint set forth in claim 1 wherein the inter-engaging means comprises a pair of rivets for attaching said first socket part to said link, a hinged connection between said one end of the second socket part and the first socket part, and a spring latch on the first socket part engageable with the second socket part for maintaining the socket parts in assembled relation.

References Cited by the Examiner
UNITED STATES PATENTS

| | | | |
|---|---|---|---|
| 587,912 | 8/1897 | Atwood | 287—87 |
| 1,437,666 | 12/1922 | Linesay | 287—89 |
| 1,554,757 | 9/1925 | Pope et al. | 308—144 X |
| 1,832,441 | 11/1931 | Anderson | 15—250.27 X |
| 2,242,021 | 5/1941 | Ball | 287—89 X |
| 2,252,350 | 8/1941 | Paulus | 287—87 X |
| 2,357,152 | 8/1944 | Whitted | 12—250.27 X |
| 2,443,856 | 6/1948 | Hermanny | 170—133 |
| 2,561,969 | 7/1951 | Bowditch | 287—89 |
| 2,600,622 | 6/1952 | Dahlgren | 74—70 |
| 2,767,004 | 10/1956 | Ashworth et al. | 287—89 |
| 2,878,506 | 3/1959 | Kohm | 74—33 X |
| 3,113,334 | 12/1963 | Howard | 15—250.27 X |
| 3,216,753 | 11/1965 | Oishei | 287—87 |

FOREIGN PATENTS

| | | |
|---|---|---|
| 170,965 | 4/1952 | Austria. |
| 433,079 | 8/1935 | Great Britain. |

FRED C. MATTERN, JR., *Primary Examiner.*

BROUGHTON G. DURHAM, MILTON KAUFMAN,
*Examiners.*

F. E. BAKER, *Assistant Examiner.*

UNITED STATES PATENT OFFICE
CERTIFICATE OF CORRECTION

Patent No. 3,299,721 January 24, 1967

Eugene R. Ziegler

It is hereby certified that error appears in the above numbered patent requiring correction and that the said Letters Patent should read as corrected below.

Column 3, line 27, for "3,039,789" read -- 3,039,798 --; column 4, line 37, for "formed" read -- is formed --; column 5, line 7, for "Linesay" read -- Livesay --; column 6, line 3, for "Kohm" read -- Krohm --.

Signed and sealed this 24th day of October 1967.

(SEAL)
Attest:

Edward M. Fletcher, Jr.
Attesting Officer

EDWARD J. BRENNER
Commissioner of Patents